United States Patent

Morikawa et al.

Patent Number: 5,341,688
Date of Patent: Aug. 30, 1994

[54] FORCE TRANSDUCER

[75] Inventors: Takeshi Morikawa, Aichi; Kouji Tsukada, Seto; Yutaka Nonomura, Nagoya; Yoshiteru Omura, Seto, all of Japan

[73] Assignee: Kabushiki Kaisha Toyota Chuo Kenkyusho, Aichi, Japan

[21] Appl. No.: 995,826

[22] Filed: Dec. 23, 1992

[30] Foreign Application Priority Data

Dec. 26, 1991 [JP] Japan .............................. 3-113507[U]

[51] Int. Cl.$^5$ .............................................. G01L 1/16
[52] U.S. Cl. ................................. 73/862.68; 73/777; 73/862.621
[58] Field of Search ................ 73/862.68, 766, 777, 73/862.621, 862.625; 338/5, 47

[56] References Cited

U.S. PATENT DOCUMENTS

| | | | |
|---|---|---|---|
| 4,071,838 | 1/1978 | Block | 338/47 |
| 4,833,929 | 5/1989 | Omura et al. | 73/862.68 |
| 4,993,266 | 2/1991 | Omura et al. | 73/754 |

FOREIGN PATENT DOCUMENTS

| | | |
|---|---|---|
| 0195232 | 9/1986 | European Pat. Off. ......... 73/862.68 |
| 0303875 | 2/1989 | European Pat. Off. |

Primary Examiner—Richard E. Chilcot, Jr.
Assistant Examiner—Elizabeth L. Dougherty
Attorney, Agent, or Firm—Oblon, Spivak, McClelland, Maier & Neustadt

[57] ABSTRACT

A force transducer comprises: an N-type silicon single crystal having a crystal face of (110) on which a force is applied; a pair of first electrodes and a pair of second electrodes mounted on the crystal face of (110) of the N-type silicon single crystal, the first electrodes facing in a direction angularly spaced by 135 degrees from a direction of <001> of the crystal, and the second electrodes being angularly spaced by 90 degrees from the first electrodes, one of the pairs of first and second electrodes being adapted to serve as input electrodes and the other being adapted to serve as output electrodes; a force transmission block connected to the crystal face of (110) of the N-type silicon single crystal for transmitting the force perpendicularly to the crystal face; and a support bed supporting the N-type silicon single crystal and connected to the N-type silicon single crystal at a face opposite to the crystal face to which the force transmission block is connected, the support bed being in the form of a planar structure having a horizontal cross-sectional shape with a short axis and a long axis.

20 Claims, 7 Drawing Sheets

FORCE TRANSDUCER

BACKGROUND OF THE INVENTION

1. Field of the Invention

The present invention relates to a pressure transducer which employs a semiconductor piezoresistive effect to convert stress to an electrical signal, and more particularly to a $\pi'_{63}$ transducer where force is applied perpendicularly to the crystal face of a silicon single crystal and a voltage output corresponding to the applied force is taken from the direction perpendicular to the direction in which the current flows.

2. Description of the Related Art

Conventional structures of force transducers employing the semiconductor piezoresistive effect as a detection method consist of structures where force is applied to a semiconductor such as silicon or germanium via a medium, and structures where force is applied to a semiconductor directly. Also, detection methods such as the following have conventionally been employed; deriving an output voltage from the change in resistance in the aforementioned semiconductor due to the force applied; incorporating this change in resistance into a wheatstone bridge circuit and deriving an output voltage from that circuit and; a method known as the $\pi'_{63}$ method whereby the direction of the electrical current flow, the direction of the voltage detection and the direction of the applied force are all at right angles to each other.

The force transducer in the present invention is of the kind which employs the $\pi'_{63}$ method of piezoresistive effect.

FIGS. 9A and 9B show an example of a force transducer for the related art where the current, voltage and force are at right angles to each other (U.S. Pat. No. 4,833,929). The construction of the force transducer 1000 is as follows. A force transmission block 5 which is square shaped in the horizontal cross-sectional plane is mounted on the upper (110) face 1a of the silicon single crystal structure 1, and the lower (110) face 1b of the silicon single crystal structure 1 is in turn mounted on a support bed 4. Then, a pair of input electrodes 2a and 2b and a pair of output electrodes 3a and 3b are formed on the upper (110) face 1a of the aforementioned silicon single crystal structure 1. The input electrodes 2a and 2b are formed at an angle of 135° going away from the <001> axis towards the <1-10> axis, and the output electrodes 3a and 3b are in turn formed at an angle of 90° from the aforementioned input electrodes 2a and 2b.

In this force transducer 1000, force is applied at right angles to the upper (110) face 1a of the aforementioned silicon single crystal structure 1 via the aforementioned force transmission block 5. The output from the force transducer for the corresponding force is then taken as the voltage between the output electrodes 3a and 3b which are at an angle of 90° from the input electrodes 2a and 2b.

With the aforementioned force transducer 1000, the intention is to produce an output which is dependant upon the perpendicular stress $\sigma_3$ ($\sigma_{<110>}$) generated along the axis <110> as a result of the force applied along the <110> axis perpendicular to the (110) face 1a of the silicon single crystal structure 1. Assuming that the support bed 4 is rigid, the acquired output voltage is dependant upon the stress $\sigma_3$ generated along the <110> axis by the applied force, and the output voltage $\Delta V'$ for this case is given by equation 1.

$$\Delta V' = b \cdot \rho \cdot J \cdot \pi'_{63} \cdot \sigma_3 \qquad 1$$

In equation 1, b is the length of the force receiving face of the force transmission block along the direction of the output electrodes, $\rho$ is the resistance ratio of the silicon single crystal structure, j is the current density and $\pi'_{63}$ is the piezo resistance coefficient.

In reality, however, in practical force transducers, stresses other than the stress $\sigma_3$ which is along the <110> axis are without fail also generated. It thus follows that the actual output $\Delta V$ from the device is not completely defined by equation 1 but is instead expressed by equation 2 which contains all six components of stress.

$$\begin{aligned}\Delta V &= \Delta V' + \Delta V_2 \\ &= b \cdot \rho \cdot J \cdot \sum_{i=1}^{6} \pi'_{6i} \cdot \sigma_i\end{aligned} \qquad 2$$

With this conventional force transducer, the stresses that were generated in addition to $\sigma_3$, that is, $\sigma_1$, $\sigma_2$, $\sigma_4$, $\sigma_5$, $\sigma_6$, were considered to be negligible, and this transducer was not constructed to take into account the detrimental effects of the output $\Delta V_2$ resulting from these stresses. This causes a problem where the negative effects of the output $\Delta V_2$ resulting from stresses other than $\sigma_3$ are detrimental to the conversion efficiency of the actual device.

The reasons for this are as follows. Table 1 and Table 2 show the value of each piezo resistance coefficient $\pi'$ for a P-type silicon single crystal structure with a resistance ratio of 7.8 $\Omega$.cm, and an N-type silicon single crystal structure with a resistance ratio of 11.7 $\Omega$.cm respectively. The aforementioned Tables 1 and 2 also show values for the stress created in a conventional type support bed and values for the device output acquired according to equation 1.

TABLE 1

| i | 1 | 2 | 3 | 4 | 5 | 6 |
|---|---|---|---|---|---|---|
| Piezo resistance coefficient | $\pi'_{61}$ | $\pi'_{62}$ | $\pi'_{63}$ | $\pi'_{64}$ | $\pi'_{65}$ | $\pi'_{66}$ |
|  | −16.3 | −16.3 | 32.6 | 0.0 | 0.0 | 40.3 |
| $\pi'_{6i}$ *1 | − | − | + | ○ | ○ | + |
| Stress $\sigma_i$ | − | − | − | + | + | ~○ |
| Output $\Delta V'$ | + | + | − | ○ | ○ | ○ |

$\rho = 7.8 \, \Omega \cdot cm$
*1; $\pi'_{6i}$ (×10$^{-12}$ cm$^2$/dyne)

TABLE 2

| i | 1 | 2 | 3 | 4 | 5 | 6 |
|---|---|---|---|---|---|---|
| Piezo resistance coefficient | $\pi'_{61}$ | $\pi'_{62}$ | $\pi'_{63}$ | $\pi'_{64}$ | $\pi'_{65}$ | $\pi'_{66}$ |
|  | −17.8 | −17.8 | 35.5 | 0.0 | 0.0 | −120.1 |
| $\pi'_{6i}$ *1 | − | − | + | ○ | ○ | − |
| Stress $\sigma_i$ | − | − | − | + | + | ~○ |
| Output $\Delta V'$ | + | + | − | ○ | ○ | ○ |

$\rho = 11.7 \, \Omega \cdot cm$
*1; $\pi'_{6i}$ (×10$^{-12}$ cm$^2$/dyne)

As shown in Tables 1 and 2, for the case where the horizontal cross-sectional shape of the support bed is square, for either a P-type or N-type structure the output produced by $\sigma_3$ is negative. However, on the other hand, the summation of the outputs produced by other stresses ($\sigma_1$ and $\sigma_2$ are positive, $\sigma_4$, $\sigma_5$ and $\sigma_6$ are zero), is positive for either a P-type or an N-type structure.

This is opposed to the output value produced by $\sigma_3$, and the overall device output is thus reduced.

SUMMARY OF THE INVENTION

It is therefore an object of this invention to provide a force transducer which has a simple structure, high sensitivity and which is highly efficient at converting stress to electrical energy, compared to conventional force transducers in which the current, voltage and stress vectors are at right angles to each other.

According to the invention, there is provided a force transducer comprising: an N-type silicon single crystal having a crystal face of (110) on which a force is to be exerted; a pair of first electrodes and a pair of second electrodes mounted on the crystal face of (110) of the N-type silicon single crystal, the first electrodes facing in a direction spaced at an angle of 135° with respect to the direction <001> of the crystal, and the second electrodes being spaced at an angle of 90° from the first electrodes, one of the pairs of the first and second electrodes being adapted to serve as input electrodes and the other being adapted to serve as output electrodes; a force transmission block connected to the crystal face of (110) of the N-type silicon single crystal for transmitting the force perpendicularly to the crystal face; and a support bed supporting the N-type silicon single crystal and connected to the N-type silicon single crystal at a face opposite to the crystal face to which the force transmission block is connected, the support bed being in the form of a planar body having a horizontal cross-sectional shape with a short axis and a long axis.

With practical force transducers, as stated previously, this output is shown by equation 2. In conventional force transducers it has been found that outputs for stresses other than $\sigma_3$ reduce the device output. However, various studies have found that the device output can be increased by using proper direction of the stress $\sigma$. It can therefore be noted that the absolute value for $\pi'_{66}$ shown in Table 2 for the N-type single crystal is remarkably high when compared to other values. If this phenomena can be advantageously utilized by superposing the output $\Delta V_2$ resulting from other stresses with the output from the original stress $\sigma_3$, it will be possible to increase the device output.

Next, the specifics of the characteristics and magnitude of the output $\Delta V_2$ will be discussed.

From equation 3 it can be seen that the output $\Delta V_2$ resulting from stress components other than the stress $\sigma_3$ is obtained from the summation of the output $\Delta V_{normal}$, which is derived from the compressive stress component or the tensile stress component (both are perpendicular stresses) and the output $\Delta V_{shear}$ derived from the shearing stress.

$$\Delta V_2 = \Delta V_{normal} + \Delta V_{shear} \qquad 3$$

Taking the aforementioned force transducer 1000 shown in FIG. 9 as an example for this explanation, when a force W was applied to the force transmission block 5 it was found that stress was generated in parallel to the (110) crystal face 1a of the silicon single crystal 1. Assuming that the stress is expressed as a stress $\sigma_b$ perpendicular to an arbitrary main stress plane S which is perpendicular to the (110) face 1a as shown in FIG. 2, the relationship between the piezo resistance coefficients $\pi'_{61}$, $\pi'_{62}$ is taken from the aforementioned electrode arrangement and $\Delta V_2$ is then expressed by equations 3 and 4. It therefore follows that the output $\Delta V$ for the entire device can be expressed by equation 5.

$$\Delta V_2 = b \cdot \rho \cdot J \cdot \sigma_b (\pi'_{61} + (\pi'_{66}/2) \cdot \cos 2\theta) \qquad 4$$

$$\begin{aligned}\Delta V &= \Delta V' + \Delta V_2 = \Delta V' + \Delta V_{normal} + \Delta V_{shear} \\ &= b \cdot \rho \cdot J \cdot \{\sigma_3 \cdot \pi'_{63} + \sigma_b (\pi'_{61} + (\pi'_{66}/2) \cdot \cos 2\theta)\}\end{aligned} \qquad 5$$

Here, $\theta$ is the angle in an anti-clockwise direction from the <001> axis. In equation 4, the first item inside the parenthesis corresponds to $\Delta V_{normal}$ and the second item corresponds to $\Delta V_{shear}$.

When the horizontal cross-sectional area of the support bed is larger than the pressure receiving area on the silicon single crystal, $\sigma_b$ is usually negative (compressive stress).

FIGS. 3A and 3B show the relationship between the output $\Delta V_2$ due to the piezoresistive effect which is derived from equation 4, and angle $\theta$ (where the long axis of the horizontal cross-sectional shape of the support bed is), for force transducers with P-type silicon single crystals and N-type silicon single crystals. For these measurements, a structure such as the one used for the conventional force transducer shown in FIG. 9 was employed. The input electrodes were therefore set up at an angle of 135° with respect to the <001> axis.

As is shown in FIG. 3A, for a P-type silicon single crystal, the output $\Delta V_2$ derived from the stresses other than the stress $\sigma_3$ which is perpendicular to the (110) face is positive in almost the entire region. It therefore follows that in Table 1, for a P-type silicon single crystal, as the output $\Delta V'$ which is derived from the stress $\sigma_3$ is negative, and it is superposed with the aforementioned output $\Delta V_2$, an overall lowering of the efficiency of the force transducer results.

On the other hand, the degree to which the output $\Delta V_2$ derived from the stresses other than the stress $\sigma_3$ becomes negative for the case of an N-type silicon single crystal is shown by the shaded area of FIG. 3B. Therefore, by using a force transducer where an N-type silicon single crystal device structure is employed in order to make $\Delta V_2$ become negative, if this output $\Delta V_2$ and the output $\Delta V'$ (where $\Delta V'$ is shown in table 2 as being negative) are superposed upon each other, as they are the same polarity, a device output greater than that for conventional devices can be achieved.

If the support bed is, for example, a rectangle whereby the horizontal cross-sectional shape has long and short axes, (the long axis of which is set at a angle $\theta$ which is within the range which will give a negative value for $\Delta V_2$), the device output can be increased by assuring that the aforementioned stress $\sigma_b$ concurs with the direction of the long axis of the support bed. More specifically, as is shown in FIG. 3B, when $\sigma_b$ is compressive stress, i.e. a negative value, a negative and absolute maximum value for $\Delta V_2$ will be attained when $\theta = 90° \pm 180n°$ where n is an integer, namely when the long axis of the rectangle is directed along the <1-10> axis. It was found that directions within 35° of the <1-10> axis would give a negative value for $\Delta V_2$, although directions within 30° would be more reliable.

The dependency of the output $\Delta V_2$ on the angle $\theta$ was also investigated in the above manner for the case where the input electrodes for the force transducer were rotated at an angle of 45° from the axis <001>. These results are shown in FIGS. 4A and 4B. FIG. 4A shows the results obtained for a P-type silicon single crystal and FIG. 4B shows the results obtained for an N-type silicon single crystal.

Looking at a P-type silicon single crystal, as is shown in FIG. 4A, the value of $\Delta V_2$ which is derived from stresses other than stress $\sigma_3$ is almost always negative. According to Table 3 the value for the output $\Delta V'$ derived from the stress $\sigma_3$ is positive, and the overall detection efficiency of the force transducer is found to be reduced as a result of the superposition of $\Delta V_2$ with $\Delta V'$.

With regards to this, for an N-type silicon single crystal a positive value is shown for directions within $\pm 35°$ of the $<001>$ axis, as is shown by FIG. 4B. So, by superposing the output $\Delta V'$ ($\Delta V'$ is shown by Table 4 to have a positive value) and the output for the aforementioned region $\Delta V_2$, it is possible to increase the device output.

TABLE 3

| i | 1 | 2 | 3 | 4 | 5 | 6 |
|---|---|---|---|---|---|---|
| Piezo resistance coefficient | $\pi'61$ 16.3 | $\pi'62$ 16.3 | $\pi'63$ −32.6 | $\pi'64$ 0.0 | $\pi'65$ 0.0 | $\pi'66$ 40.3 |
| $\pi'_{6i}$ *1 | + | + | − | ◯ | ◯ | + |
| Stress $\sigma_i$ | − | − | − | + | + | ~◯ |
| Output $\Delta V'$ | − | − | + | ◯ | ◯ | ◯ |

$\rho = 7.8\ \Omega \cdot cm$
*1; $\pi'_{6i}\ (\times 10^{-12}\ cm^2/dyne)$

TABLE 4

| i | 1 | 2 | 3 | 4 | 5 | 6 |
|---|---|---|---|---|---|---|
| Piezo resistance coefficient | $\pi'61$ 17.8 | $\pi'62$ 17.8 | $\pi'63$ −35.5 | $\pi'64$ 0.0 | $\pi'65$ 0.0 | $\pi'66$ −120.1 |
| $\pi'_{6i}$ *1 | + | + | − | ◯ | ◯ | − |
| Stress $\sigma_i$ | − | − | − | + | + | ~◯ |
| Output $\Delta V'$ | − | − | + | ◯ | ◯ | ◯ |

$\rho = 11.7\ \Omega \cdot cm$
*1; $\pi'_{6i}\ (\times 10^{-12}\ cm^2/dyne)$

FIG. 1 is a view of a primary construction of a force transducer for the present invention. In the force transducer 100 in this diagram, a pair of input electrodes, 12a and 12b, and a pair of output electrodes, 14a and 14b, are formed on the (110) face 10a of an N-type single crystal 10. Here, 12a and 12b are formed at an angle of 135° in an anti-clockwise direction with respect to the $<001>$ axis and 14a and 14b (only one is shown) are formed at an angle of 90° with respect to 12a and 12b. There is a support bed 30 which is rectangular in the horizontal plane underneath the N-type silicon single crystal 10 and when $\theta=0°$ in the direction of $<001>$ this long axis X is at an angle of $60°\pm180n°\leftarrow\theta\leftarrow120°\pm180n°$ (where n is an integer), in other words within $\pm30°$ from the $<1-10>$ axis. In FIG. 1, $\theta=90°$. Also, a force transmission block 20 which is square in the horizontal plane is mounted on the aforementioned silicon crystal 10. Force W is then applied to the transmission block 20 from above at right angles to the (110) face 10a of the silicon single crystal 10.

A fixed voltage is then applied across the input electrodes 12a and 12b of the force transducer 100, or a fixed current flow is set up, and a force W is then applied to the upper face of the transmission block 20. An output corresponding to this force is then taken from across the output electrodes 14a and 14b (only one is shown).

A characteristic of the present invention is that the support bed 30 for this force transducer 100 possesses a flat horizontal cross-sectional shape with long and short axes, such as, for example, a rectangle. As a result of this, the maximum value of the stress $\sigma_b$ which is generated parallel to the (110) face when a force is applied at right angles to the (110) face 10a of the N-type silicon single crystal 10, occurs along the direction of the long axis X of the support bed 30. Also, as this long axis X is within $\pm 30$ of the $<1-10>$ axis, from equation 2 and FIG. 3B, the output $\Delta V_2$ which is derived from the sum of the shear stress $\sigma_6$ and the perpendicular stresses $\sigma_{1,2}$ has a negative value, as does the output derived from the stress $\sigma_3$. It therefore follows that the force transducer output can be increased by superposing the output $\Delta V'$ derived from the stress $\sigma_3$ with $\Delta V_2$. The effect of this is that a force transducer which is highly efficient at converting stress into electrical energy can be constructed.

Also, for the present invention, as is shown in FIG. 6, by forming a pair of input electrodes, 12a and 12b, and a pair of output electrodes, 14a and 14b on the (110) face 10a of an N-type single crystal 10, where 12a and 12b are formed at an angle of 45° with respect to the $<001>$ axis and 14a and 14b are formed at an angle of 90° with respect to 12a and 12b, an output superposition effect like the one described above can be attained. This is to say that the long axis X of the support bed 30, the horizontal cross-sectional shape of which is rectangular, is at an angle of $-30°\pm180n°\leftarrow\theta\leftarrow-30°\pm180n°$ where n is an integer. By using this kind of construction, the effect of which becomes apparent from equation 2 and FIG. 4B, the output $\Delta V'$ derived from the stress $\sigma_3$ and the output $\Delta V_2$ derived from stresses other than $\sigma_3$ come to be of the same polarity. So, as with the case described above, it becomes possible to increase the output of the force transducer.

FIG. 5 is a view showing how the output varies as the ratio between the long axis and the short axis (long axis divided by short axis) of the horizontal cross-section (which is rectangular) of the support bed for the aforementioned force transducer is varied. In this case, a current was supplied by applying a voltage of 5 V across the input electrodes, and an applied weight of 15 kg supplied the force W. When, as in FIG. 5, the output $\Delta V$ for the present invention is compared to that of a conventional device where the long axis/short axis ratio is one, a maximum improvement of about 20% can be confirmed. In the present invention, a long axis/short axis ratio is preferably 1.0 to 4.0, more preferably 1.5 to 4.0.

The construction of the above devices has been described using a support bed, the horizontal cross-sectional shape of which is rectangular, but a shape where the axis in one direction is longer than that in the other direction such as an ellipse, a rhombus or a parallelogram or other flat shapes would also be suitable.

Also, the N-type silicon single crystal in the present invention may include P-type silicon single crystals diffused with, for example, phosphorus or arsenic impurities to form partially an N-type crystal region, as well as N-type silicon single crystals.

DETAILED DESCRIPTION OF PREFERRED EMBODIMENTS

The following is a description of the preferred embodiments for the present invention.

First Embodiment

Figure 1:
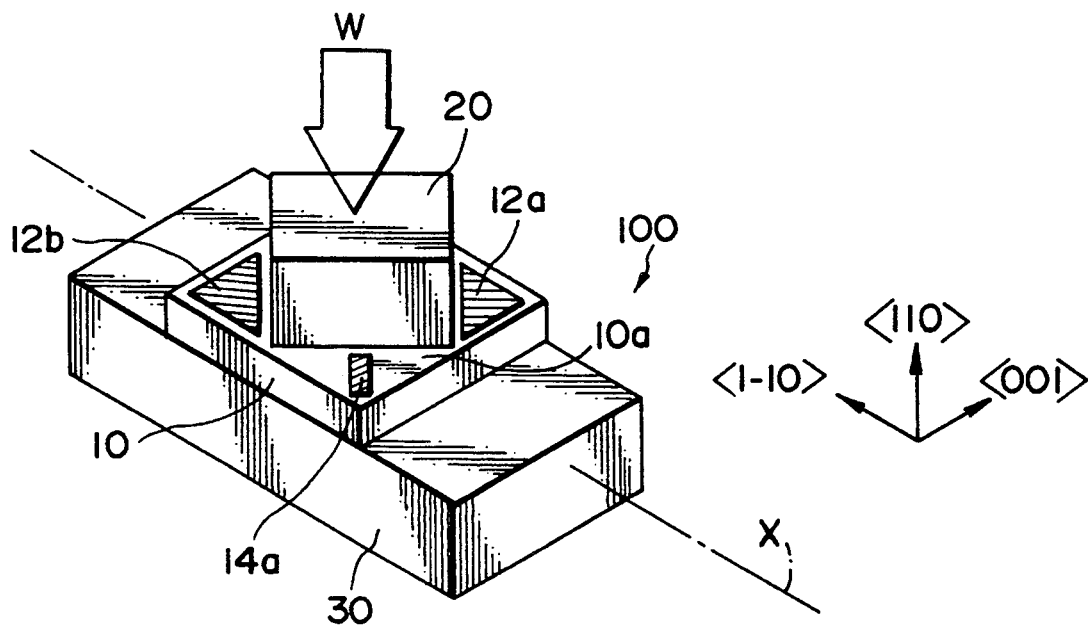
FIG. 1 is a schematic perspective view of a force transducer according to a first embodiment of the present invention.
Figure 2:
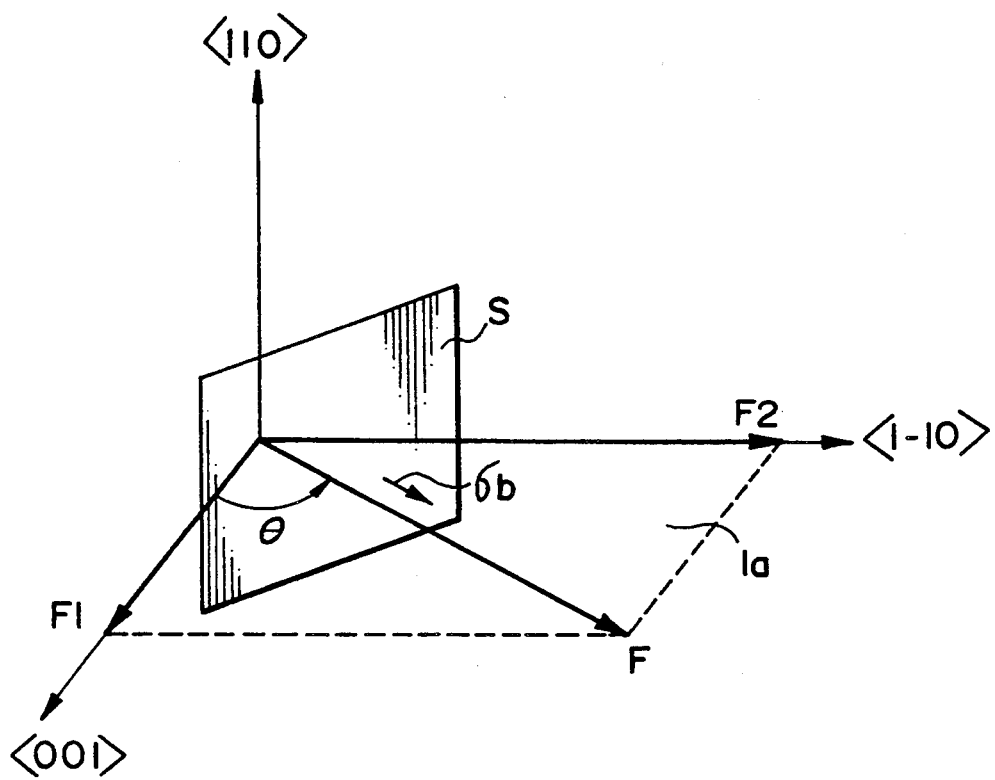
FIG. 2 is a three-dimensional graph describing the relationship between the main stress plane and the crystal axis.
Figure 3A:
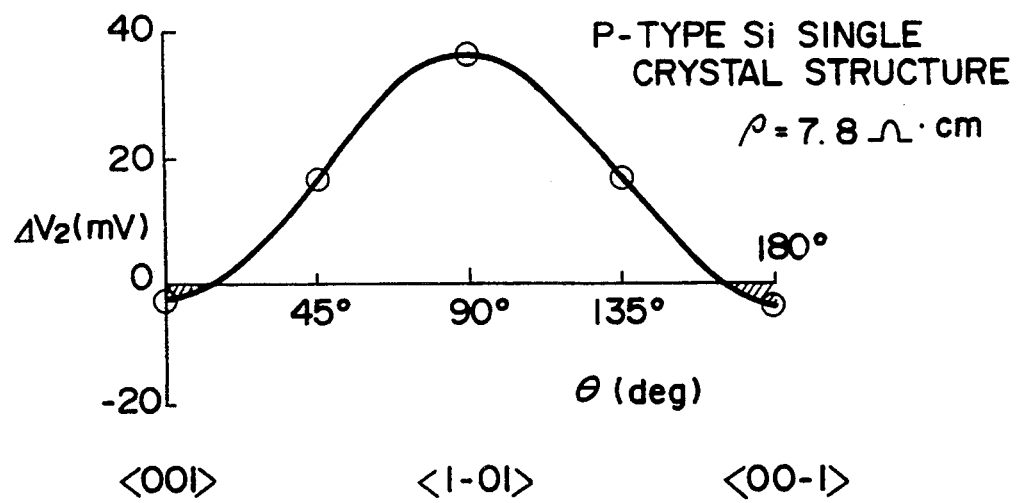
FIG. 3A is a view for a P-type silicon single crystal and, FIG. 3B is a view for an N-type silicon single crystal.
Figure 3B:
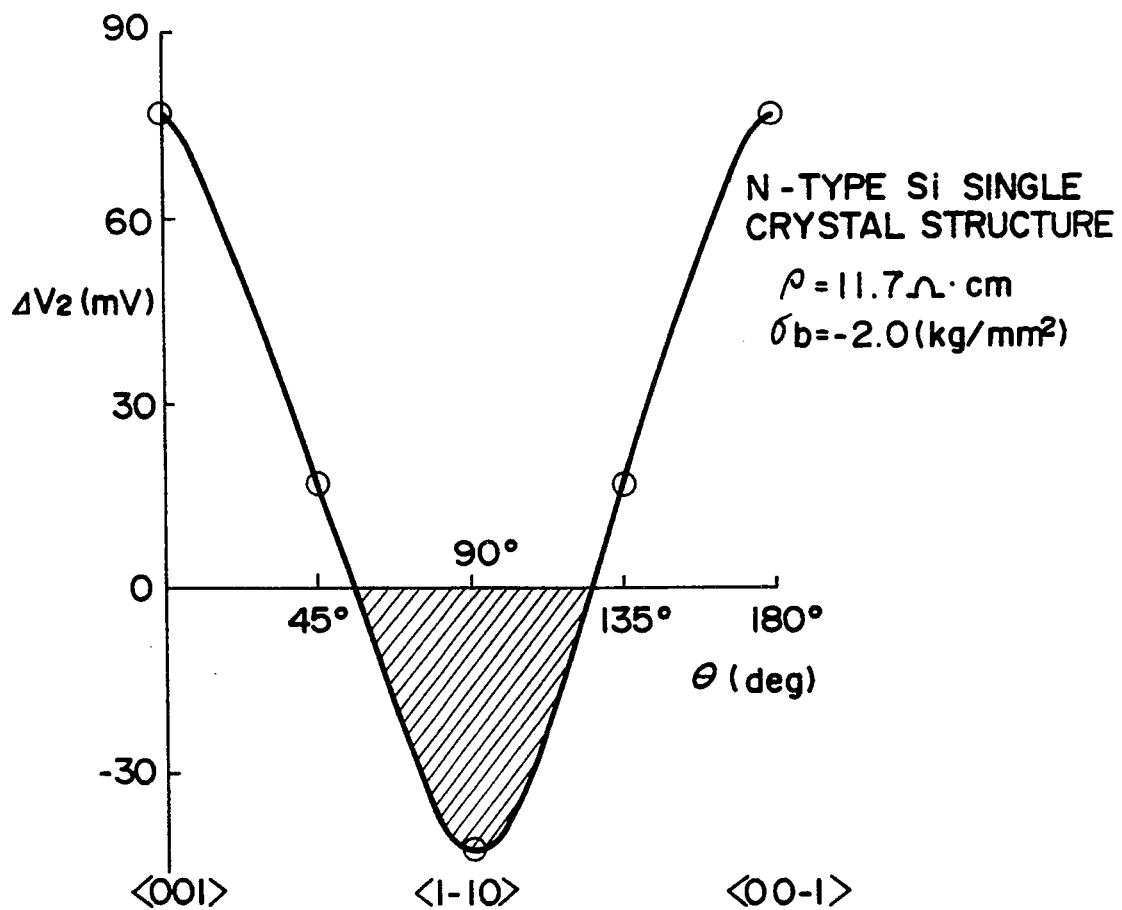
FIG. 3 is a graph showing the relationship between $\theta$ and the output $\Delta V_2$ for the case where the input electrodes are formed at an angle of 135° from the <001> axis, whereby.
Figure 4A:
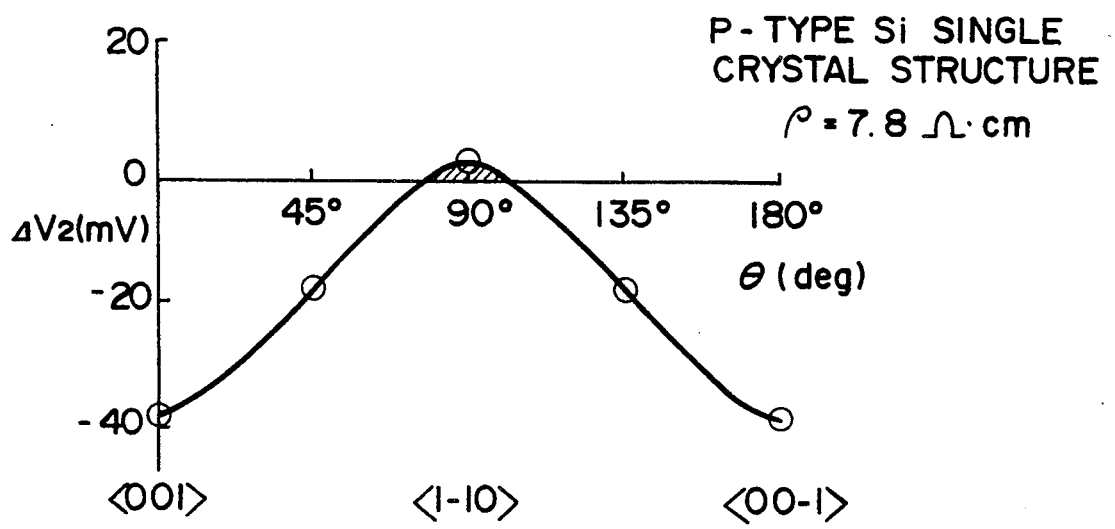
FIG. 4A is a view for a P-type silicon single crystal and, FIG. 4B is a view for an N-type silicon single crystal.
Figure 4B:
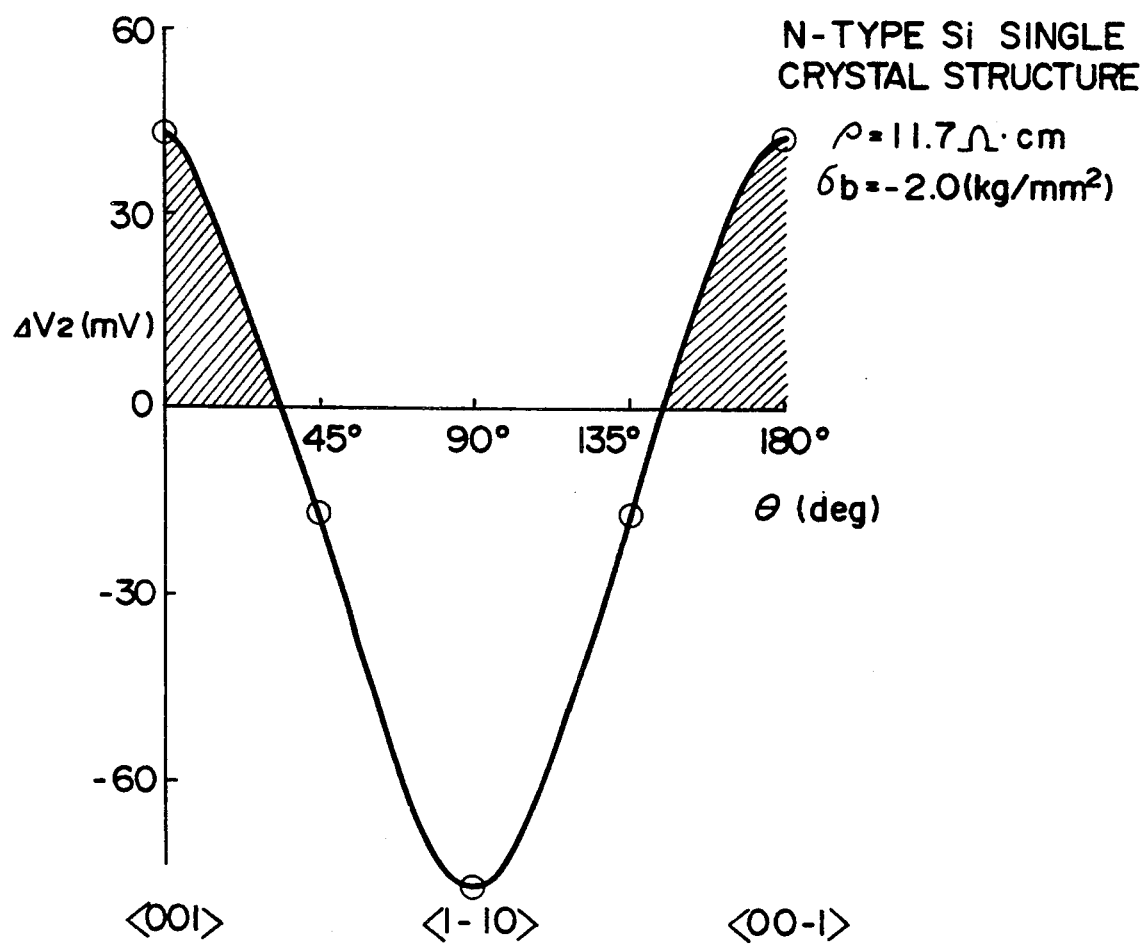
FIG. 4 is a graph of the relationship between $\theta$ and the output $\Delta V_2$ for the case where the input electrodes are formed at an angle of 45° from the <001> axis, whereby.

FIG. 1 shows a perspective view of a force transducer 100 for a first embodiment of the present invention. An N-type silicon single crystal 10 is in the form of a rectangular parallelepiped having a (110) crystal face 10a of surface area of 1.5 mm long and 1.5 mm wide, a specific resistance of approximately 12 $\Omega$.cm and a thickness of approximately 100 $\mu$m. This single crystal 10 is mounted on a rectangular crystalline glass support bed 30 which is 3 mm long, 1.5 mm wide and 0.5 mm thick. The support bed 30 has a horizontal cross-sectional shape of a rectangle, and the long axis X of the rectangle extends along the <1-10> direction. Also, a square crystalline glass force transmission block 20 with sides 1 mm long having a thickness of 0.5 mm is in turn mounted on the aforementioned silicon crystal 10. Then, a pair of input electrodes, 12a and 12b, and a pair of output electrodes, 14a and 14b, are formed on the (110) face 10a of the aforementioned silicon single crystal 10 by aluminium vapor deposition. Here, 12a and 12b are formed at an angle of 135° with respect to the <001> axis and 14a and 14b are formed at an angle of 90° with respect to 12a and 12b.

Figure 5:
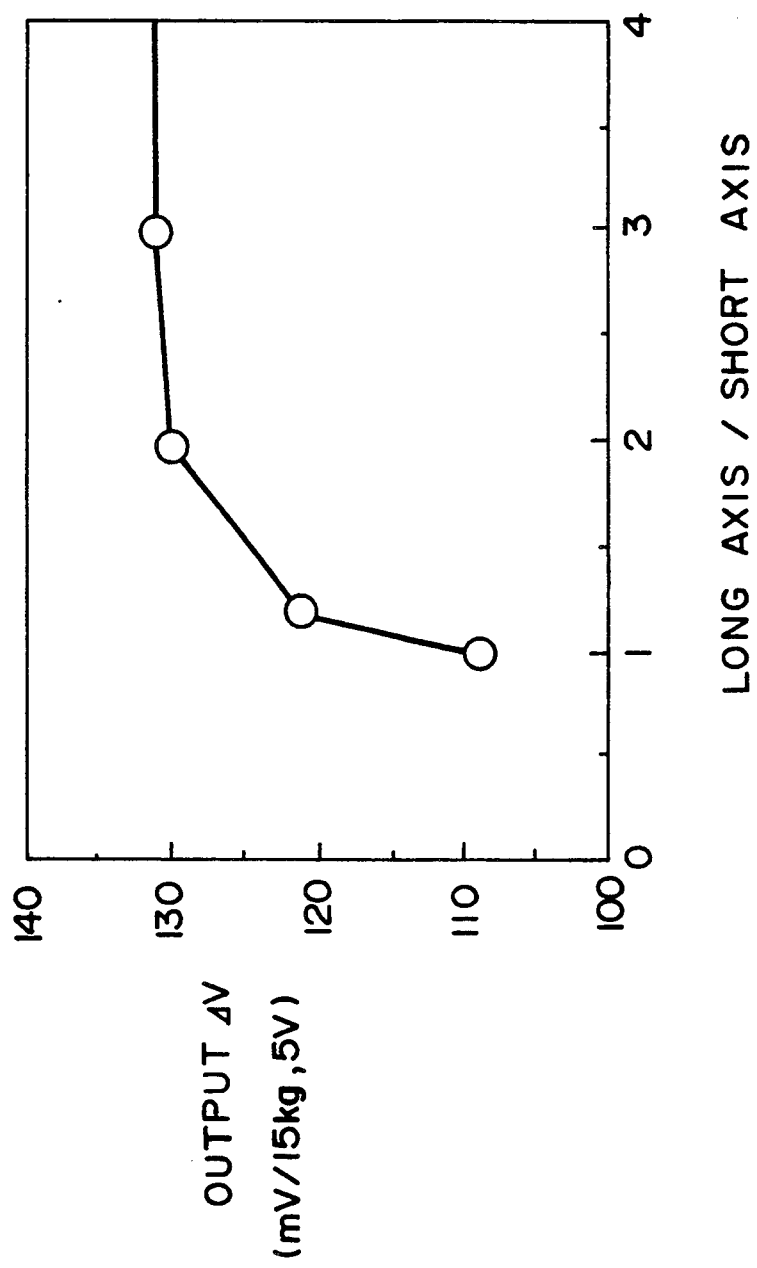
FIG. 5 is a graph showing how the output $\Delta V$ varies as the ratio between the long axis and the short axis of the support bed (long axis divided by short axis) is varied.

According to FEM analysis of the stress created when a weight of 15 kg is applied to the force transmission block 20 of the force transducer 100, the stress component $\sigma_1$ along the long axis X of the support bed 30 is negative, and the generation of compressive stress can thus be confirmed. At this time, as is shown in FIG. 5, the device output $\Delta V$ is approximately 130 mV, which is a substantial improvement when compared to the conventional type where the long axis/short axis ratio is one and the device output voltage is approximately 110 mV.

Second Embodiment

Figure 6:
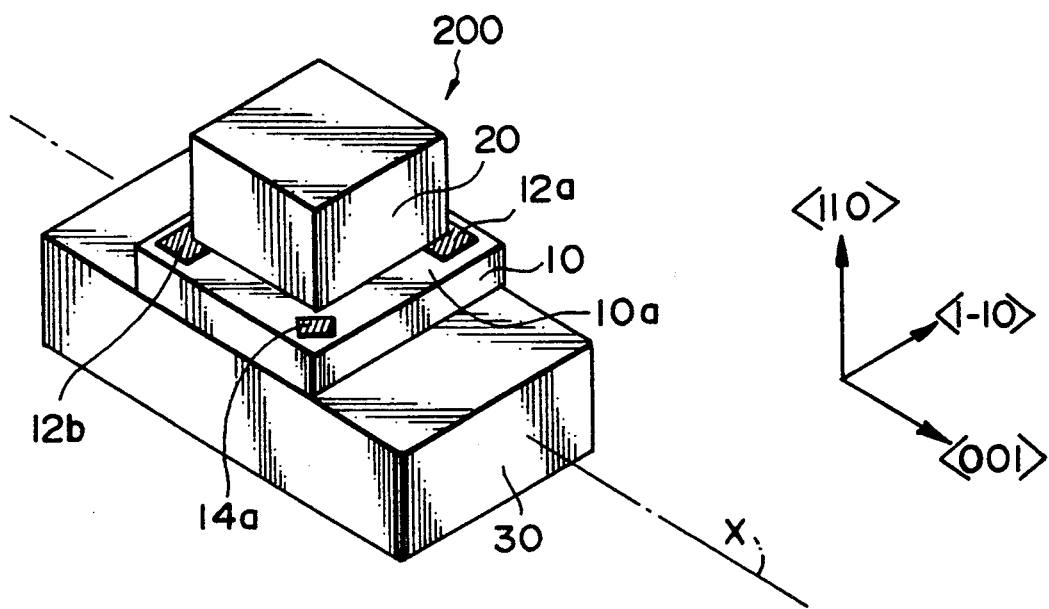
FIG. 6 is a schematic perspective view of a force transducer according to a second embodiment of the present invention.

FIG. 6 shows a perspective view of a force transducer 200 for a second embodiment of the present invention. An N-type silicon single crystal 10 is in the form of a rectangular parallelepiped having a (110) crystal face 10a of surface area 1.5 mm long and 1.5 mm wide, a specific resistance of approximately 12 $\Omega$.cm and a thickness of approximately 100 $\mu$m. The aforementioned single crystal 10 is mounted on a rectangular crystalline glass support bed 30 which is 4.5 mm long, 1.5 mm wide and 0.5 mm thick, the long axis of which extends along the <001> axis. Also, a square crystalline glass force transmission block 20 with sides 1 mm long and a thickness of 0.5 mm is in turn mounted on the aforementioned silicon single crystal 10. Then, a pair of input electrodes, 12a and 12b, and a pair of output electrodes, 14a and 14b, are formed on the (110) face 10a of the aforementioned silicon single crystal 10 by aluminium vapor deposition. Here, 12a and 12b are formed at an angle of 45° with respect to the <001> axis and 14a and 14b are formed at an angle of 90° with respect to 12a and 12b.

According to FEM analysis of the stress created when a weight of 15 kg is applied to the force transmission block 20 of the force transducer 200, the stress component $\sigma_1$ along the long axis X of the support bed 30 is negative, and the generation of compressive stress can thus be confirmed. At this time, as is shown in FIG. 5, the device output $\Delta V$ is approximately 150 mV, which is a substantial improvement when compared to the conventional type where the long axis/short axis ratio is one and the device output voltage is approximately 110 mV.

Third Embodiment

Figure 7:
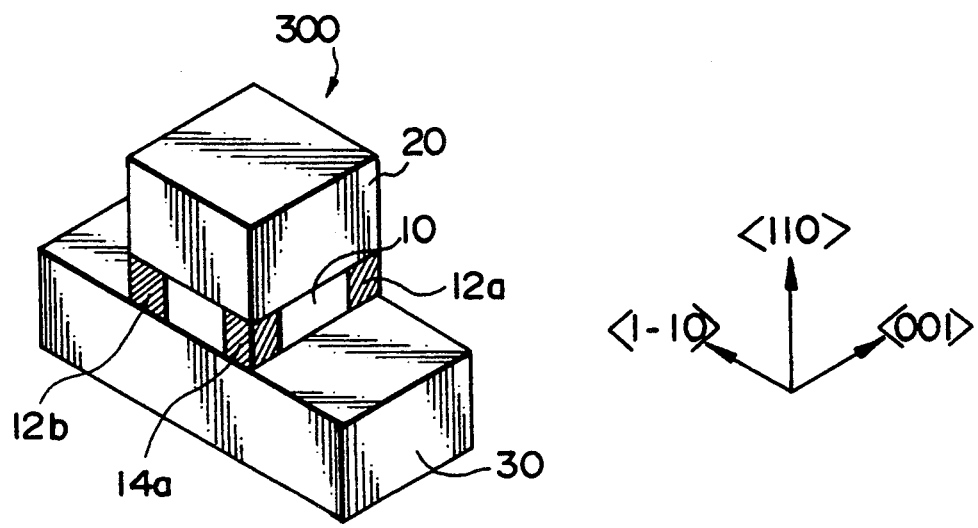
FIG. 7 is a schematic perspective view of a force transducer according to a third embodiment of the present invention.

FIG. 7 shows a perspective view of a force transducer 300 for a third embodiment of the present invention. An N-type silicon single crystal 10 is in the form of a rectangular parallelepiped having a square (110) crystal face 10a with sides of 1 mm in length, a specific resistance of approximately 12 $\Omega$ per centimeter and a thickness of approximately 100 $\mu$m. The aforementioned single crystal 10 is mounted on a rectangular crystalline glass support bed 30 which is 2 mm long, 1 mm wide and 0.5 mm thick. This long axis extends along the <1-10> axis. Also, a square crystalline glass force transmission block 20 with sides 1 mm long having a thickness of 0.5 mm is in turn mounted on the aforementioned silicon single crystal 10. Then, a pair of input electrodes, 12a and 12b, and a pair of output electrodes, 14a and 14b, are formed at the corners of side faces of the aforementioned single crystal 10 by aluminium vapor deposition. Here, 12a and 12b are formed at an angle of 135° with respect to the <001> axis and 14a and 14b are formed at an angle of 90° with respect to 12a and 12b.

This embodiment differs from the aforementioned first embodiment in the following ways; the silicon single crystal 10 and the force transmission block 20 have the same dimensions and shape within the horizontal cross-sectional plane; the silicon single crystal 10 and the force transmission block 20 are laminated in such a way as to be completely superimposed upon each other and; the input electrodes 12a and 12b, and the output electrodes 14a and 14b, are formed at the corners of the silicon single crystal 10. According to this kind of construction, invalid electric currents flowing outside the force receiving face on the silicon single crystal 10 can be reduced, thus improving the conversion efficiency of the device.

Fourth Embodiment

Figure 8A:
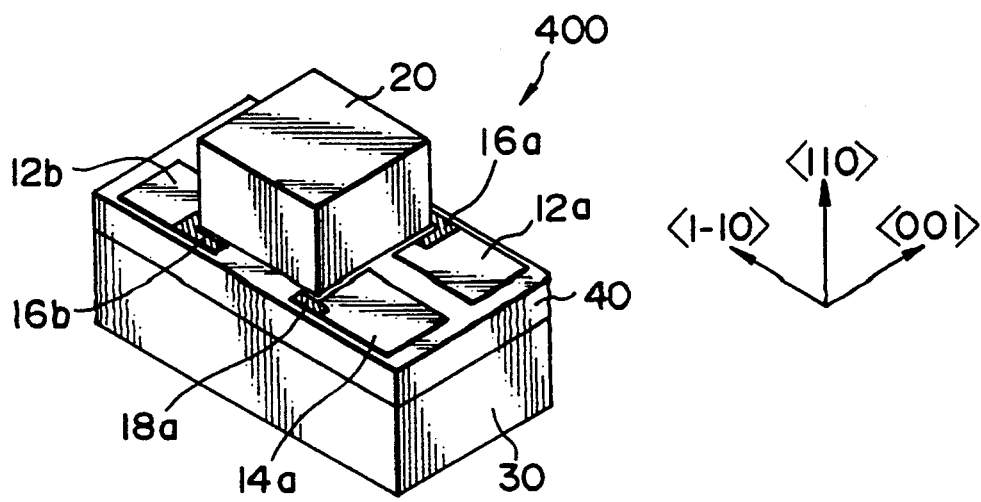
FIG. 8A is a schematic perspective view.
Figure 8B:
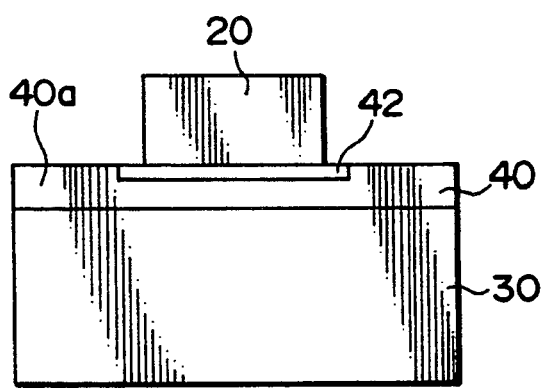
FIG. 8B is a front view and FIG. 8C is a plan view of the same force transducer according to a fourth embodiment of the present invention.
Figure 8C:
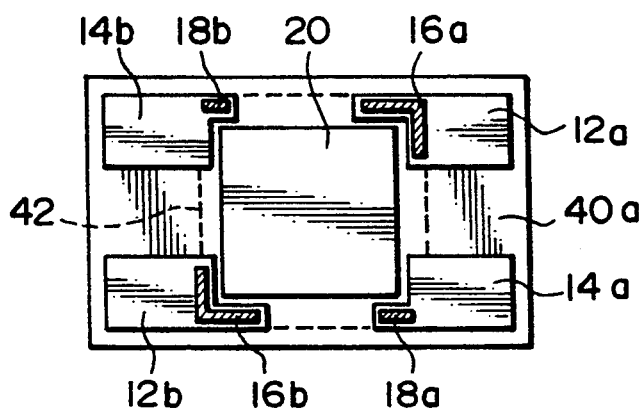
Figure 9A:
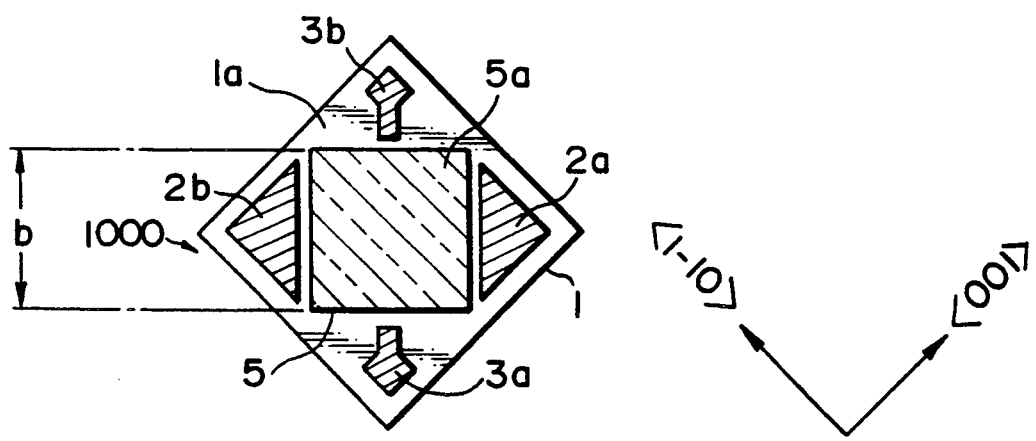
FIG. 9A is a plan view and FIG. 9B is a front view of an example of a conventional force transducer.
Figure 9B:
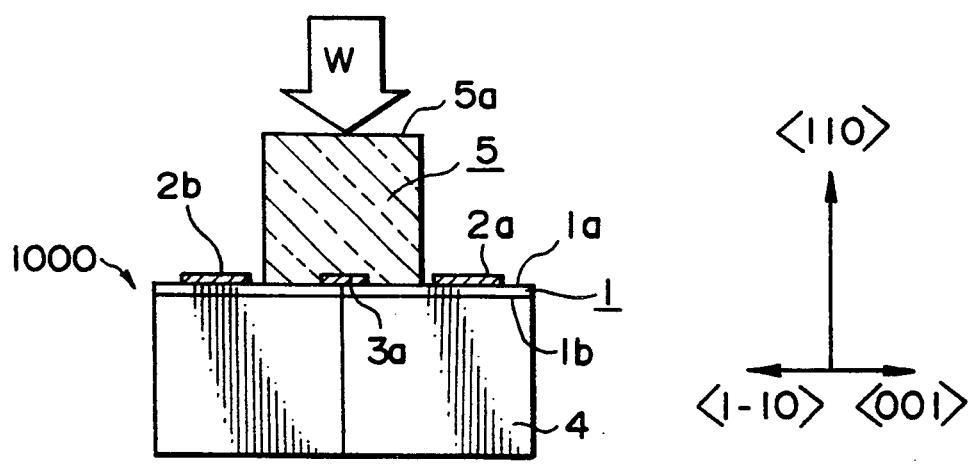

FIG. 8 shows a perspective view of a force transducer 400 for a fourth embodiment of the present invention. In this embodiment, an N-type force receiving layer 42 is formed by phosphorus diffusion onto the crystal face 40a of a P-type silicon single crystal 40 which is 3 mm long, 1.5 mm wide and 0.10 mm thick. The aforementioned P-type silicon single crystal 40 is in turn mounted on a crystalline glass support bed 30 which is 3 mm long, 1.5 mm wide and 0.5 mm thick, the long axis of which extends along the <1-10> axis. A square crystalline glass force transmission block 20 with sides of length 1.0 mm and having a thickness of 0.5 mm is then mounted on the aforementioned N-type force receiving layer 42.

Then, a pair of input electrodes, 12a and 12b along with contact holes 16a and 16b which go through to the force receiving layer 42, and a pair of output electrodes, 14a and 14b along with contact holes 18a and 18b which go through to the force receiving layer 42, are formed by aluminium vapor deposition on the (110) face 40a of the aforementioned single crystal 40. Here, 12a and 12b along with contact holes 16a and 16b which go through to the force receiving layer 42 are formed at an angle of 135° with respect to the <001> axis and 14a and 14b along with contact holes 18a and 18b which go through to the force receiving layer 42 are formed at an angle of 90° with respect to 12a, 12b, 16a and 16b.

In this fourth embodiment, as an N-type silicon single crystal, an N-type crystal part is formed by the diffusion of impurities such as phosphorus into a P-type silicon single crystal. By employing this kind of construction, an N-type silicon single crystal part with an arbitrary region having an arbitrary specific resistance can be formed irrespective of the horizontal cross-sectional dimensions of the silicon single crystal 40 and an electrical current flow for that region can be defined.

This invention should by no means be limited to the foregoing examples, and various modifications may be suggested without departing from the scope of the appended claims.

For example, these embodiments have been described using a support bed, the horizontal cross-sectional shape of which is rectangular, but a shape such as an ellipse, a rhombus or a parallelogram would also be suitable providing that the effect of the output $\Delta V_2$ which is derived from stresses other than $\sigma_3$, meaning stresses $\sigma_1$, $\sigma_2$ and $\sigma_6$, is sufficiently large. Also, for the substance for the support bed, the use of a material which has a high degree of rigidity in one direction such as fibre reinforced resin will also give the same results.

According to the present invention, by having a specific shape for the support bed, the output provided by the perpendicular stress $\sigma_3$ and the output provided by stresses other than $\sigma_3$ are superposed upon each other. The present invention provides a force transducer which has a simple structure, excellent sensitivity, and is highly efficient at converting force to electrical energy, compared to conventional force transducers where the current and voltage vectors are at right angles to each other.

What is claimed is:

1. A force transducer comprising:

(a) an N-type silicon single crystal having a crystal face of (110) on which a force is to applied;
   (b) a pair of first electrodes and a pair of second electrodes mounted on the crystal face of (110) of said N-type silicon single crystal, said first electrodes facing in a direction angularly spaced by 135 degrees from a direction of <001> of the crystal, and said second electrodes being angularly spaced by 90 degrees from said first electrodes, one of said pairs of first and second electrodes being adapted to serve as input electrodes and the other being adapted to serve as output electrodes;
   (c) a force transmission block connected to the crystal face of (110) of said N-type silicon single crystal for transmitting the force perpendicularly to the crystal face; and
   (d) a support bed supporting said N-type silicon single crystal and connected to said N-type silicon single crystal at a face opposite to the crystal face to which said force transmission block is connected, said support bed being in the form of a planar body having a horizontal cross-sectional shape with a short axis and a long axis which are different in length.

2. A force transducer according to claim 1, wherein the horizontal cross-sectional shape of said support bed is such that the ratio of the short axis to the long axis (long axis/short axis) is in the range of 1.0 to 4.0.

3. A force transducer according to claim 2, wherein the horizontal cross-sectional shape of said support bed is such that the ratio of the short axis to the long axis is in the range of 1.5 to 4.0.

4. A force transducer according to claim 1, wherein the horizontal cross-sectional shape of said support bed is rectangular.

5. A force transducer according to claim 1, wherein the horizontal cross-sectional shape of said support bed is an ellipse, a rhombus or a parallelogram.

6. A force transducer according to claim 1, wherein said input electrodes are angularly spaced by 135 degrees from the direction of <001> of said N-type silicon single crystal and said output electrodes are angularly spaced by 90 degrees from said input electrodes.

7. A force transducer according to claim 6, wherein the long axis of said support bed is at an angle ranging between about +35 degrees and about −35 degrees with respect to the direction of <1-10> of said N-type silicon single crystal.

8. A force transducer according to claim 7, wherein the long axis of said support bed is at an angle ranging between about +30 degrees and about −30 degrees with respect to the direction of <1-10> of said N-type silicon single crystal.

9. A force transducer according to claim 8, wherein the long axis of said support bed is aligned with the direction of <1-10> of said N-type silicon single crystal.

10. A force transducer according to claim 1, wherein said output electrodes are angularly spaced by 135 degrees from the direction of <001> of said N-type silicon single crystal and said input electrodes are angularly spaced by 90 degrees from said output electrodes.

11. A force transducer according to claim 10, wherein the long axis of said support bed is at an angle ranging between about +35 degrees and about −35 degrees with respect to the direction of <001> of said N-type silicon single crystal.

12. A force transducer according to claim 11, wherein the long axis of said support bed is at an angle ranging between about +30 degrees and about −30 degrees with respect to the direction of <001> of said N-type silicon single crystal.

13. A force transducer according to claim 12, wherein the long axis of said support bed is aligned with the direction of <001> of said N-type silicon single crystal.

14. A force transducer according to claim 1, wherein said N-type silicon single crystal is of a rectangular parallelepiped.

15. A force transducer according to claim 1, wherein said N-type silicon single crystal is smaller than said support bed as viewed in plan.

16. A force transducer according to claim 1, wherein said electrodes are mounted on an upper surface of said N-type silicon single crystal.

17. A force transducer according to claim 1,
wherein a top surface of said N-type silicon single crystal has a shape which is identical with a shape of a top surface of said force transmission block,
wherein the top surfaces of said N-type silicon single crystal and said force transmission block are a same size so that N-type silicon single crystal is completely superimposed on the force transmission block, and
wherein said electrodes are mounted on a side surface of said N-type silicon single crystal.

18. A force transducer according to claim 1, wherein said N-type silicon single crystal is formed by diffusing impurities such as phosphorus or arsenic into a P-type silicon single crystal.

19. A force transducer according to claim 18,
wherein said N-type silicon single crystal is formed on a part of said P-type silicon single crystal, and
wherein said electrodes are mounted around said N-type silicon crystal.

20. A force transducer according to claim 1, wherein said support bed is made of a high-rigidity material such as crystalline glass or fiber reinforced resin.

* * * * *